US008739652B2

United States Patent
Higashijima et al.

(10) Patent No.: US 8,739,652 B2
(45) Date of Patent: Jun. 3, 2014

(54) HANDLE WEIGHT MOUNTING STRUCTURE OF SADDLE-RIDE-TYPE VEHICLE

(75) Inventors: Yoshiki Higashijima, Wako (JP); Hiroshi Furuse, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/482,281

(22) Filed: May 29, 2012

(65) Prior Publication Data
US 2012/0304805 A1   Dec. 6, 2012

(30) Foreign Application Priority Data

Jun. 1, 2011   (JP) ................................ 2011-123510

(51) Int. Cl.
*B62K 21/12*   (2006.01)

(52) U.S. Cl.
USPC ........................................ 74/551.1; 74/551.8

(58) Field of Classification Search
USPC .............. 74/551.1–551.9; 16/421; 173/162.2; 473/318
IPC .............................................. B62K 21/14,11/14
See application file for complete search history.

(56) References Cited

U.S. PATENT DOCUMENTS

| | | | | | |
|---|---|---|---|---|---|
| 3,832,912 | A | * | 9/1974 | Edwards | 74/551.8 |
| 5,605,075 | A | * | 2/1997 | Chi | 74/551.1 |
| 5,950,498 | A | * | 9/1999 | Gossett et al. | 74/551.8 |
| 8,342,489 | B1 | * | 1/2013 | Richardson et al. | 267/140.11 |
| 2003/0121360 | A1 | * | 7/2003 | Hussy | 74/558 |
| 2007/0151404 | A1 | | 7/2007 | Kuwata et al. | |

FOREIGN PATENT DOCUMENTS

| | | | |
|---|---|---|---|
| CN | 201082747 Y | * | 7/2008 |
| FR | 2 789 648 A1 | | 8/2000 |
| JP | 57-025929 A | | 2/1982 |
| JP | 59102672 A | * | 6/1984 |
| JP | 06-321159 A | | 11/1994 |
| JP | 09240542 A | * | 9/1997 |
| JP | 10-067376 A | | 3/1998 |
| JP | 2899566 B2 | | 6/1999 |
| JP | 2004217070 A | * | 8/2004 |

OTHER PUBLICATIONS

Translation of CN 201082747Y from SIPO website.*
Translation of JP 1997 240542 from JPO website.*
"How to Secure Bolts Using Threadlocker: Auto Clinic", from Popular Mechanics. Retrieved Jul. 3, 2013.*

* cited by examiner

*Primary Examiner* — Marcus Charles
*Assistant Examiner* — Adam D Rogers
(74) *Attorney, Agent, or Firm* — Birch, Stewart, Kolasch & Birch, LLP

(57) ABSTRACT

A handle weight mounting structure of a saddle-ride-type vehicle includes a dynamic damper on the inside of a handle pipe while rigidly mounting a handle weight. A hollow handle pipe is provided with the handle weight arranged in the handle pipe by insertion from an outer end of the handle pipe. The handle weight includes a bolt insertion hole having a tapered portion on an inner portion thereof in the vehicle widthwise direction. A split groove with a nut member is formed into a tapered shape and is engaged with a split-groove side of the handle weight. A weight fixing bolt passes through the bolt insertion hole of the handle weight and fastens the handle weight and the nut member to each other. A mounting member for a dynamic damper is supported on the inside of the handle pipe in a floating state and is mounted on the nut member.

20 Claims, 14 Drawing Sheets

US 8,739,652 B2

HANDLE WEIGHT MOUNTING STRUCTURE OF SADDLE-RIDE-TYPE VEHICLE

CROSS-REFERENCE TO RELATED APPLICATIONS

The present application claims priority under 35 USC 119 to Japanese Patent Application No. 2011-123510 filed Jun. 1, 2011 the entire contents of which are hereby incorporated by reference.

BACKGROUND OF THE INVENTION

1. Field of the Invention

The present invention relates to the handle weight mounting structure of a saddle-ride-type vehicle.

2. Description of Background Art

A mounting structure is known for a handle weight mounted on an end portion of a handle pipe of a saddle-ride-type vehicle, that includes a handle weight having a cylindrical portion on which a split groove is formed; and a cylindrical nut having a tapered surface, wherein the handle weight is rigidly fixed to a handle pipe due to a wedge action generated by pushing the cylindrical nut into the cylindrical portion. See, for example, Japanese patent 2899566). In Japanese patent 2899566, the vibration isolation property is enhanced by integrally mounting a vibration absorbing rod which extends toward a center side in the vehicle widthwise direction on the cylindrical nut.

However, in the above-mentioned conventional handle weight mounting structure, the handle weight is rigidly mounted on the handle pipe. Thus, there may be a case where the vibration isolation property cannot be sufficiently ensured. Although the vibration isolation property can be enhanced by mounting a dynamic damper on the handle pipe, in the above-mentioned construction, it is difficult to mount the dynamic damper on the inside of the handle pipe.

SUMMARY AND OBJECTS OF THE INVENTION

The present invention has been made in view of the above-mentioned circumstances, and it is an object of an embodiment of the present invention to provide the handle weight mounting structure of a saddle-ride-type vehicle where a dynamic damper is arranged on the inside of a handle pipe while rigidly mounting a handle weight on the handle pipe.

To achieve the above-mentioned object, according to an embodiment of the present invention a handle weight mounting structure of a saddle-ride-type vehicle is provided that includes a hollow handle pipe (16); a handle weight (55) which is arranged in the handle pipe (16) by insertion from an outer end (16C) of the handle pipe (16), the handle weight (55) being provided with a bolt insertion hole (62) that has a tapered portion (64A) on an inner portion thereof in the vehicle widthwise direction and a split groove (63); a nut member (57) that is formed into a tapered shape and is engaged with a split-groove (63) side of the handle weight (55); and a bolt (56) that is made to pass through the bolt insertion hole (62) of the handle weight (55) and fastens the handle weight (55) and the nut member (57) to each other, wherein a mounting member (59) for a dynamic damper (58) that is supported on the inside of the handle pipe (16) in a floating state is mounted on the nut member (57).

Due to such a construction, the handle weight mounting structure of a saddle-ride-type vehicle includes the hollow handle pipe; the handle weight that is arranged in the handle pipe by insertion from an outer end of the handle pipe, the handle weight being provided with the bolt insertion hole that has the tapered portion on the inner portion thereof in the vehicle widthwise direction and the split groove; the nut member that is formed into a tapered shape and is engaged with the split-groove side of the handle weight; and the bolt that is made to pass through the bolt insertion hole of the handle weight and fastens the handle weight and the nut member to each other, wherein the mounting member for a dynamic damper which is supported on the inside of the handle pipe in a floating state is mounted on the nut member. Thus, the dynamic damper can be supported on the inside of the handle pipe by the mounting member. Accordingly, the dynamic damper can be mounted on the inside of the handle pipe while rigidly mounting the handle weight on the handle pipe.

Further, in the above-mentioned construction, a groove portion (71) may be formed on a center portion side of the nut member (57) in the vehicle widthwise direction, and an engaging portion (78) that is engaged with the groove portion (71) may be formed on the mounting member (59).

In this case, the groove portion is formed on the center portion side of the nut member in the vehicle widthwise direction, and the engaging portion that is engaged with the groove portion is formed on the mounting member. Thus, the dynamic damper can be sub-assembled to the nut member with a simple construction where the engaging portion of the mounting member is engaged with the groove portion of the nut member.

Further, a projecting portion (70) that is engaged with the split groove (63) may be formed on the nut member (57).

In this case, by engaging the nut member with the split groove, the rotation of the nut member can be prevented. Thus, the handle weight and the dynamic damper can be securely fixed to each other.

Further, an adhesive agent may be applied to a threadedly engaging portion (56B) of the bolt (56) that is threadedly engaged with the nut member (57).

In this case, the adhesive agent is applied to the threadedly engaging portion of the bolt that is threadedly engaged with the nut member. Thus, the threaded engagement of the bolt and the nut member can be fixed whereby the fixing of the handle weight to the handle pipe can be made more stable.

Further, a knuckle guard (50) may be arranged in front of the handle pipe (16), and the knuckle guard (50) may be rigidly supported on a center side of the handle pipe (16) in the vehicle widthwise direction and the handle weight (55).

In this case, the knuckle guard is rigidly supported on the center side of the handle pipe in the vehicle widthwise direction and the handle weight. Thus, the knuckle guard becomes a so-called closed type whereby the knuckle guard can be firmly fixed, and the vibration isolation property can be also enhanced by the handle weight and the dynamic damper.

Further, an outer end portion (62A) of the bolt insertion hole (62) of the handle weight (55) in the vehicle widthwise direction may project outwardly to a greater extent than an outer side surface (60A) of the handle weight (55), and the knuckle guard (50) may be made of a resin and is fastened to the outer end portion (62A) of the bolt insertion hole (62) in the vehicle widthwise direction by the bolt (56) at a spigot.

In this case, the outer end portion of the bolt insertion hole of the handle weight in the vehicle widthwise direction projects outwardly to a greater extent than the outer side surface of the handle weight, and the knuckle guard is fastened to the outer end portion of the bolt insertion hole in the vehicle widthwise direction by the bolt at a spigot. Thus, the number of parts for fastening the knuckle guard can be decreased, and also the knuckle guard is fastened to the outer end portion of the handle weight in the vehicle widthwise direction whereby the knuckle guard can be supported in a stable manner.

Further, a mounting portion (54) of the knuckle guard (50) on an outer side in the vehicle widthwise direction may be formed in an approximately U-shape opening rearward, projecting portions (97, 97) which project toward an opening portion side may be formed on both open edges (96, 96) of a U-shaped portion (95) that face each other in an opposed manner, and a rear member (98) that occupies the opening portion of the U-shaped portion (95) of the knuckle guard (50) and is engaged with the projecting portions (97, 97) may be provided as a part separate from the knuckle guard (50).

In this case, the mounting portion on the outer side of the knuckle guard in the vehicle widthwise direction is formed into an approximately U-shape opening rearwardly, the projecting portions that project toward the opening portion side are formed on both open edges of the U-shaped portion that face each other in an opposed manner, the rear member that occupies the opening portion of the U-shaped portion of the knuckle guard and is engaged with the projecting portions is provided as a part separate from the knuckle guard. Due to such a construction, when a large load is applied to the knuckle guard frontwardly, the rear member is removed, and the knuckle guard can be removed frontwardly by allowing the handle weight to pass through the U-shaped portion that opens rearwardly. Accordingly, a load applied to the knuckle guard can be released, and a replacement cost of parts can be suppressed.

Further, a lever member (25), a pivot bolt (26) that constitutes a pivot of the lever member (25), and a holder member (35) that is fastened to the pivot bolt (26) may be mounted on the handle pipe (16), and the knuckle guard (50) may be fastened to a fastening portion (39) formed on a front surface of the holder member (35), and a projecting portion (51A) that projects toward a holder member (35) side may be formed on a rear surface of the knuckle guard (50), and an engaging portion (38A) that is engaged with the projecting portion (51A) may be formed on the holder member (35).

In this case, the holder member is mounted on the handle pipe by the pivot bolt of the lever member and the knuckle guard is fastened to the fastening portion formed on the front surface of the holder member. Thus, the number of parts for mounting the knuckle guard can be decreased, and the rotation of the knuckle guard can be prevented due to the engagement of the projecting portion formed on the rear surface of the knuckle guard with the engaging portion of the holder member.

In the handle weight mounting structure of the saddle-ride-type vehicle according to an embodiment of the present invention, the mounting member for the dynamic damper that is supported in the inside of the handle pipe in a floating state is mounted on the nut member that is engaged with the split groove side of the handle weight. Thus, the dynamic damper can be supported on the inside of the handle pipe by the mounting member. Accordingly, the dynamic damper can be mounted on the inside of the handle pipe while rigidly mounting the handle weight on the handle pipe.

Further, the engaging portion that is engaged with the groove portion of the nut member is formed on the mounting member. Thus, the dynamic damper can be sub-assembled to the nut member with a simple construction wherein the engaging portion of the mounting member is engaged with the groove portion of the nut member.

Further, by engaging the nut member with the split groove, the rotation of the nut member can be prevented. Thus, the handle weight and the dynamic damper can be securely fixed to each other.

Still further, the threaded engagement of the bolt and the nut member can be fixed by the adhesive agent. Thus, fixing of the handle weight to the handle pipe can be made more stable.

Further, the knuckle guard is rigidly supported on a center side of the handle pipe in the vehicle widthwise direction and the handle weight. Thus, the knuckle guard becomes a so-called closed type whereby the knuckle guard can be firmly fixed, and the vibration isolation property can be also enhanced by the handle weight and the dynamic damper.

Still further, the knuckle guard is fastened to the outer end portion of the bolt insertion hole in the vehicle widthwise direction by a bolt at a spigot. Thus, the number of parts for fastening the knuckle guard can be decreased, and also the knuckle guard is fastened to the outer end portion of the handle weight in the vehicle widthwise direction whereby the knuckle guard can be supported in a stable manner.

Further, the rear member that occupies the opening portion of the U-shaped portion of the knuckle guard and is engaged with the projecting portions is provided as a part separate from the knuckle guard. Thus, when a large load is applied to the knuckle guard frontwardly, the rear member is removed, and the knuckle guard can be removed frontwardly by allowing the handle weight to pass through the U-shaped portion that opens rearwardly. Accordingly, a load applied to the knuckle guard can be released, and a replacement cost of parts can be suppressed.

Still further, the holder member is mounted on the handle pipe by the pivot bolt of the lever member and the knuckle guard is fastened to the fastening portion formed on the front surface of the holder member. Thus, the number of parts for mounting the knuckle guard can be decreased, and the rotation of the knuckle guard can be prevented due to the engagement of the projecting portion formed on the rear surface of the knuckle guard with the engaging portion of the holder member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
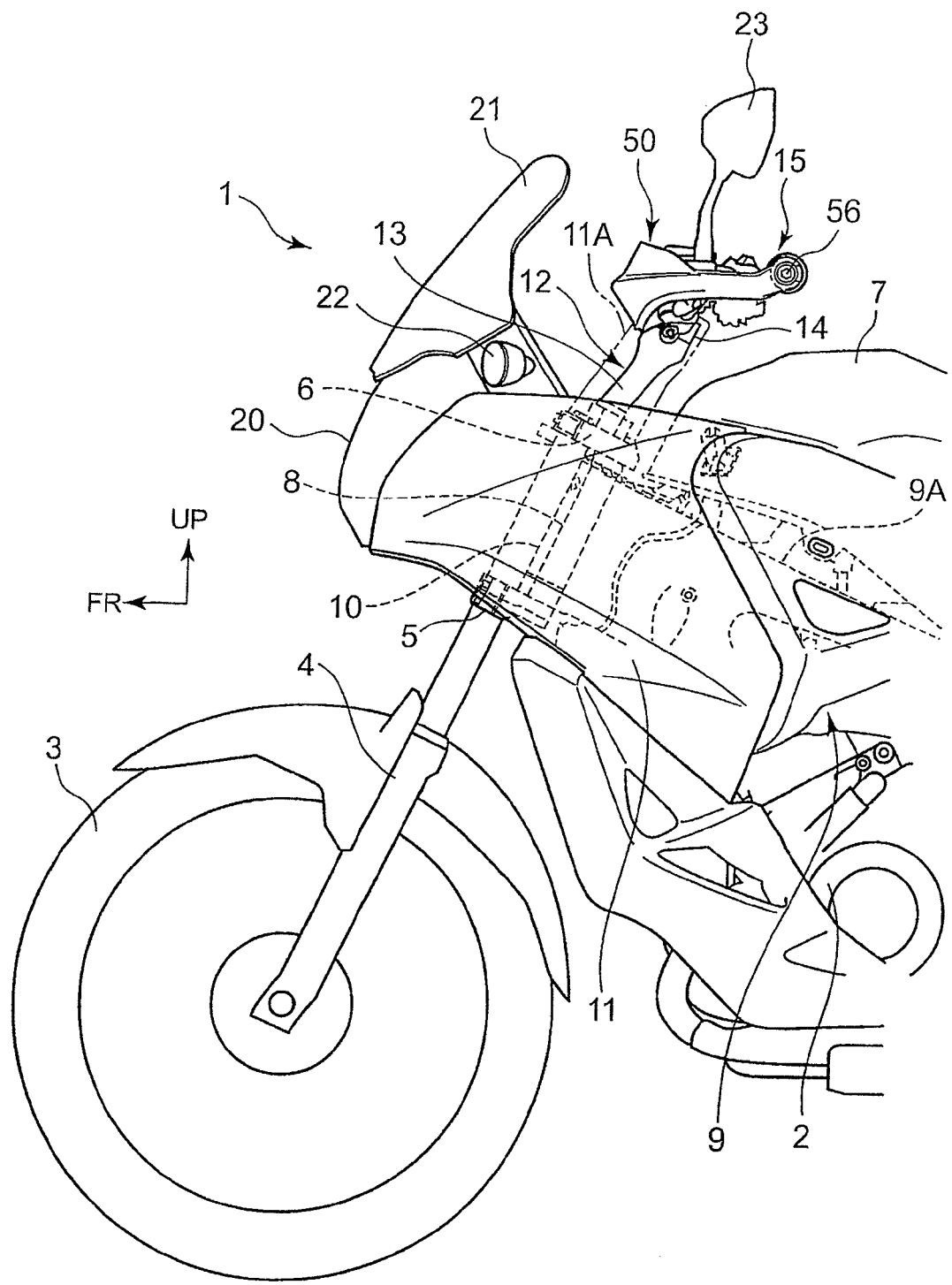
FIG. 1 is a left side view showing a front portion of a motorcycle according to an embodiment of the present invention.

Hereinafter, the handle weight mounting structure of a saddle-ride-type vehicle according to an embodiment of the present invention is explained in conjunction with drawings. In the explanation made hereinafter, the frontward and rearward directions, leftward and rightward directions and the like are, unless otherwise specified, equal to the directions of the vehicle explained hereinafter. Further, in the drawings, an arrow FR indicates a front side of the vehicle, an arrow UP indicates an upper side of the vehicle, and an arrow LH indicates a left side of the vehicle.

FIG. 1 is a left side view showing a front portion of a motorcycle according to the embodiment of the present invention.

The motorcycle 1 (saddle-ride-type vehicle) is a saddle-ride-type vehicle where an engine 2 is mounted on an approximately center portion of a vehicle body in the longitudinal direction, a front wheel 3 is arranged in front of the engine 2, and a rear wheel (not shown in the drawing) is arranged behind the engine 2.

The front wheel 3 is rotatably supported on a pair of left and right front forks 4, and a bottom bridge 5 and a top bridge 6 are mounted on upper portions of the pair of front forks 4 in this order from below. A steering shaft 8 that extends parallel to the front forks 4 is arranged between the bottom bridge 5 and the top bridge 6. A head pipe 10 that supports the steering shaft 8 is mounted on a front end of a vehicle body frame 9, and the front forks 4 are rotatably supported on the head pipe 10 by way of the steering shaft 8.

The vehicle body frame 9 includes a main frame 9A that extends in the rearward and downward direction from the head pipe 10 above the engine 2, and a fuel tank 7 is arranged above the main frame 9A.

The peripheries of the head pipe 10 and a front portion of the main frame 9A are covered with a pair of left and right front cowls 11. A headlight unit 20 is mounted on a front portion of the front cowl 11, and a wind screen 21 that extends upwardly is mounted on an upper portion of the front cowl 11. A pair of left and right blinkers 22 is arranged behind the headlight unit 20.

A handle holder 12 is mounted on an upper surface of the top bridge 6, and the handle holder 12 includes a lower holder 13 that is mounted on the upper surface of the top bridge 6 and an upper holder 14 that is mounted on an upper portion of the lower holder 13. The bar handle 15 that extends in the vehicle widthwise direction is fixed to the handle holder 12 in a state wherein the bar handle 15 is sandwiched between the lower holder 13 and the upper holder 14. The bar handle 15 for steering the front wheel 3 is formed of a single metal pipe that extends in the vehicle widthwise direction, and extends in the lateral direction in a state where a center portion of the bar handle 15 is supported on the handle holder 12.

A handle cover 11A that covers the periphery of the handle holder 12 is arranged below the bar handle 15. Further, a pair of left and right side mirrors 23 is mounted on the bar handle 15.

Figure 2:
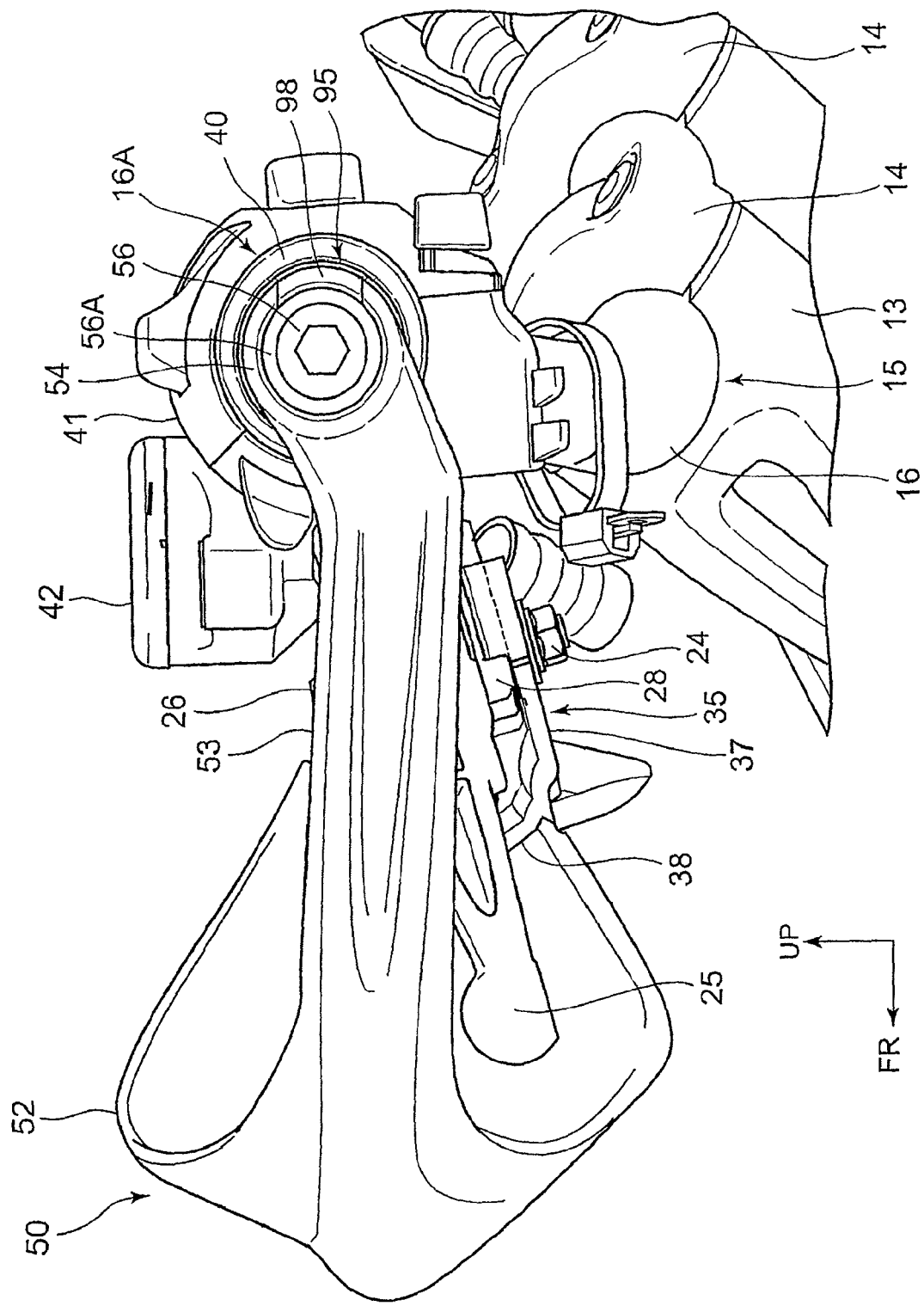
FIG. 2 is a left side view of a bar handle as viewed from a left side of a vehicle.
Figure 3:
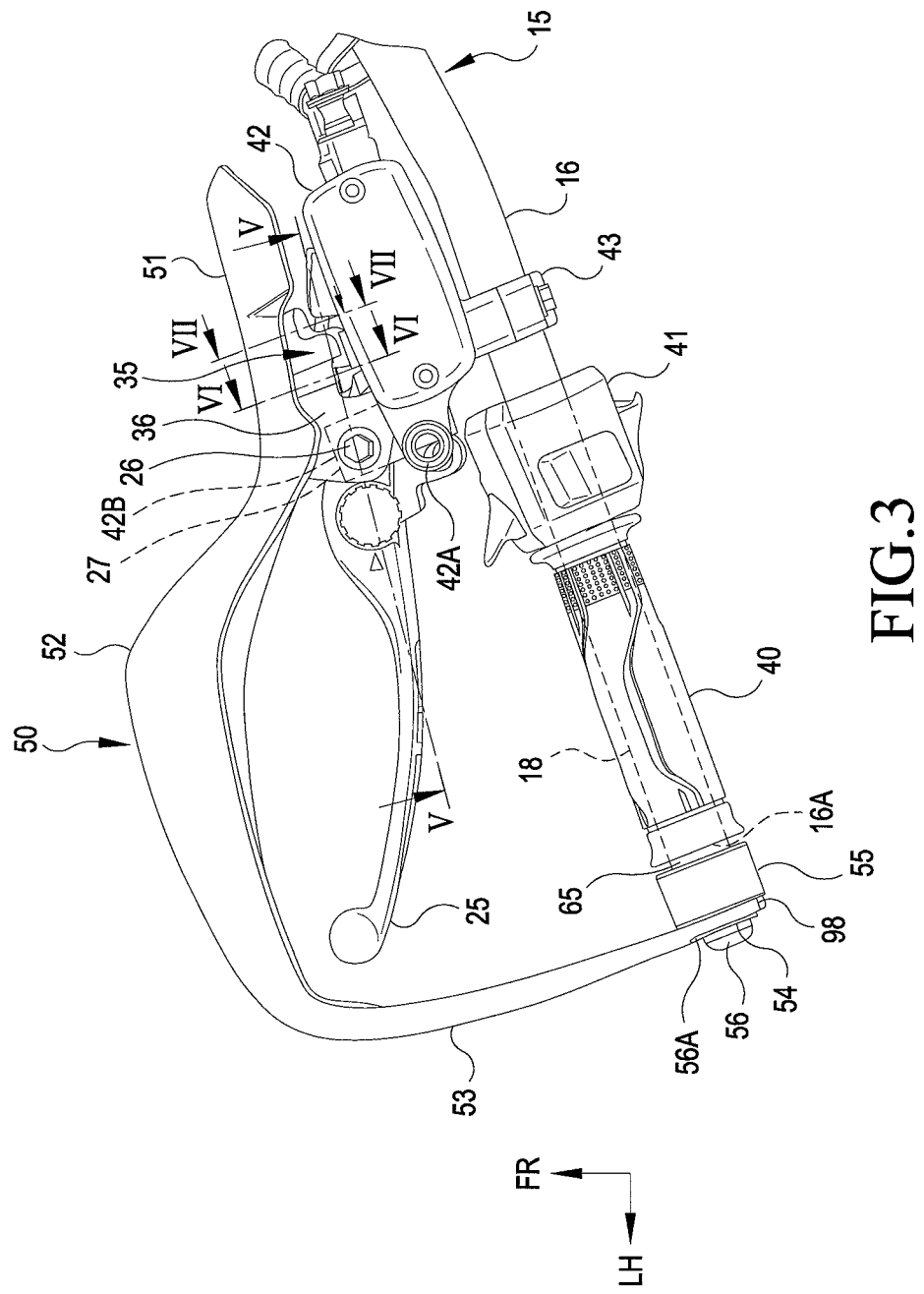
FIG. 3 is a plan view of a left portion of the bar handle as viewed from above.
Figure 4:
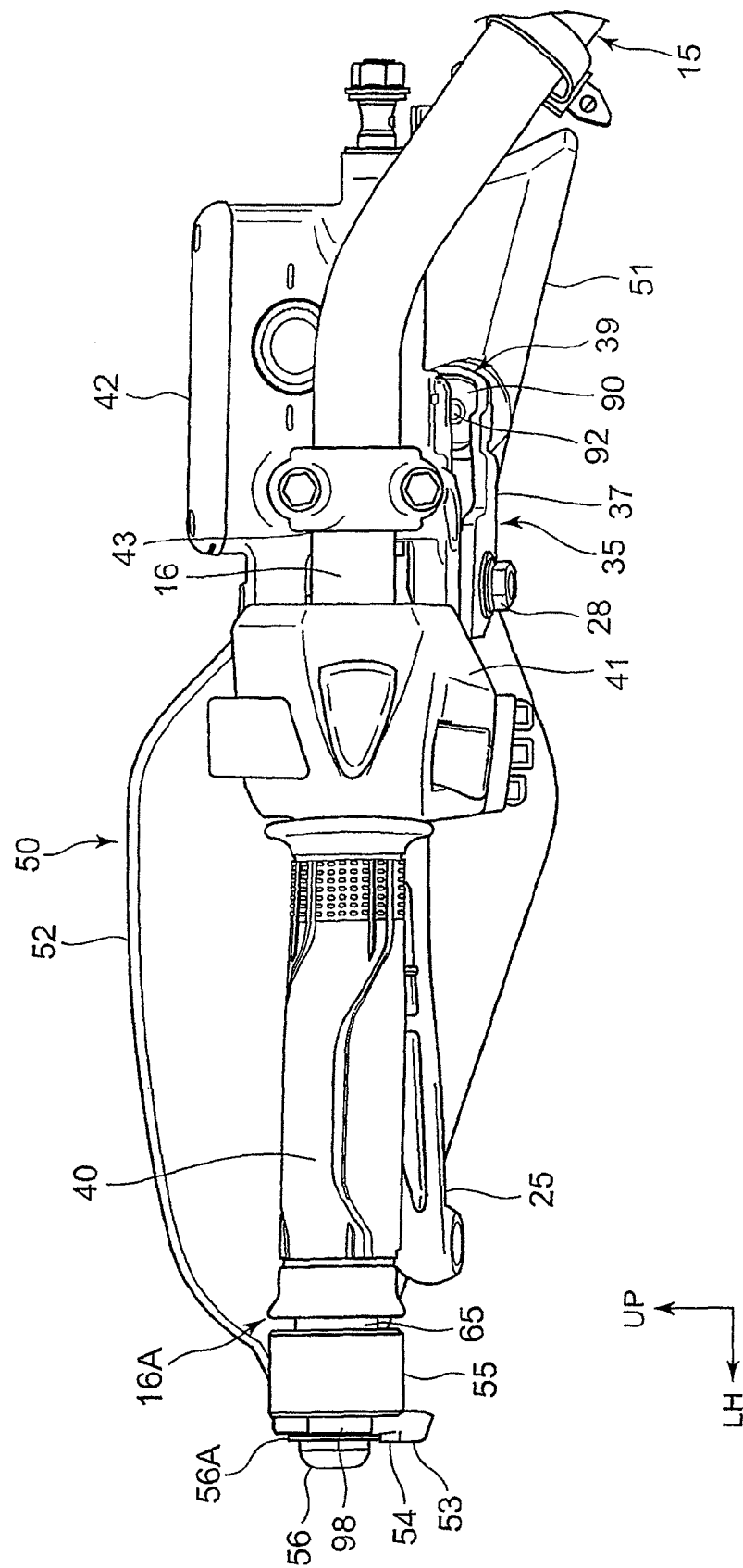
FIG. 4 is a view of the left portion of the bar handle as viewed from behind.

FIG. 2 is a left side view of the bar handle 15 as viewed from a left side of the vehicle. FIG. 3 is a plan view of a left portion of the bar handle 15 as viewed from above. FIG. 4 is a view of the left portion of the bar handle 15 as viewed from behind.

As shown in FIG. 2 and FIG. 3, the bar handle 15 includes handle pipes that are supported on the handle holder 12 and extend in the rightward and leftward directions respectively from a center portion of the bar handle 15, and a grip 40 for holding by a rider of the motorcycle 1 is mounted on ends of the left handle pipe 16 and the right handle pipe (not shown in the drawing) respectively. The grip 40 is made of a resin material and is formed into a cylindrical shape. The grip 40 is mounted on an outer peripheral surface 18 of the handle pipe 16 by allowing the handle pipe 16 to be inserted into the grip 40 from an outer end of the handle pipe 16.

A switch housing 41 in which various switches such as a blinker switch are housed is mounted on the handle pipe 16 inside in the vehicle widthwise direction from the grip 40 and is arranged adjacent to the grip 40.

A master cylinder 42 of a hydraulic clutch is mounted on the handle pipe 16 inside in the vehicle widthwise direction from the switch housing 41 and is arranged adjacent to the switch housing 41. The master cylinder 42 is fixedly mounted on the handle pipe 16 by a master cylinder holder 43 in such a manner that the handle pipe 16 is sandwiched between the master cylinder 42 and the master cylinder holder 43. The master cylinder 42 includes a mirror fastening portion 42A on which the side mirror 23 is mounted and a lever holder portion 42B on which a clutch lever 25 (lever member) is supported, and a pivot bolt 26 that constitutes a pivot for allowing swinging of the clutch lever 25 is mounted on the lever holder portion 42B.

Further, a holder member 35 that covers the lever holder portion 42B from above and below and from a front side is mounted on the lever holder portion 42B by the pivot bolt 26.

A cylindrical handle weight 55 that reduces vibrations of the handle pipe 16 is mounted on an outer end portion 16A of the handle pipe 16. Due to the provision of the handle weight 55, a resonance frequency of the handle pipe 16 can be shifted to a frequency that is hardly influenced by vibrations thus realizing the vibration isolation. The handle weight 55 is made of metal.

A knuckle guard 50 that covers a hand of the rider who grasps the grip 40 from a front side is mounted on the handle pipe 16. The knuckle guard 50 is formed by integral molding using a resin material. The knuckle guard 50 includes an inner fixing portion 51 that is rigidly mounted on the holder member 35 arranged on a center side of the bar handle 15 in the vehicle widthwise direction and extends outwardly in the vehicle widthwise direction; a bulging portion 52 that extends outwardly while bulging frontwardly from the inner fixing portion 51 and an outer fixing portion 53 that extends rearwardly from the bulging portion 52 and is rigidly fixed to the handle weight 55 on an outer end portion 16A side of the handle pipe 16. To be more specific, a front side of the master cylinder 42 is covered with the inner fixing portion 51 and a front side and lateral sides of the clutch lever 25 and the grip 40 are covered with the bulging portion 52 and the outer fixing portion 53.

More specifically, the knuckle guard 50 is a so-called closed-type knuckle guard wherein the outer fixing portion 53 is fixed to the outer end portion 16A side of the handle pipe 16 and also covers a lateral side surface side of the handle pipe 16. The outer fixing portion 53 is rigidly supported on the handle weight 55 by a weight fixing bolt 56 that is inserted into the handle weight 55 from the outside in the vehicle widthwise direction.

As described above, the closed-type knuckle guard 50 is rigidly supported on the holder member 35 arranged on the center side of the handle pipe 16 in the vehicle widthwise direction and the handle weight 55 arranged on the outer end portion 16A side of the handle pipe 16. Thus, the knuckle guard 50 can be firmly fixed.

On the other hand, on the above-mentioned right handle pipe (not shown in the drawing), a cylindrical throttle tube (not shown in the drawing) which is rotatably mounted on an outer periphery of the handle pipe together with a master cylinder (not shown in the drawing) of a front brake, a switch box (not shown in the drawing) and the like. In the right handle pipe, the grip is mounted on an outer periphery of the above-mentioned throttle tube. Thus, the grip is arranged on an outer periphery of the handle pipe. A knuckle guard is mounted on the right handle pipe 16 in the same manner as the left handle pipe, wherein the knuckle guard is fixed to an outer end portion side of the right handle pipe while covering a front side of the grip. In this embodiment, the detailed explanation of the right knuckle guard is omitted.

Figure 5:
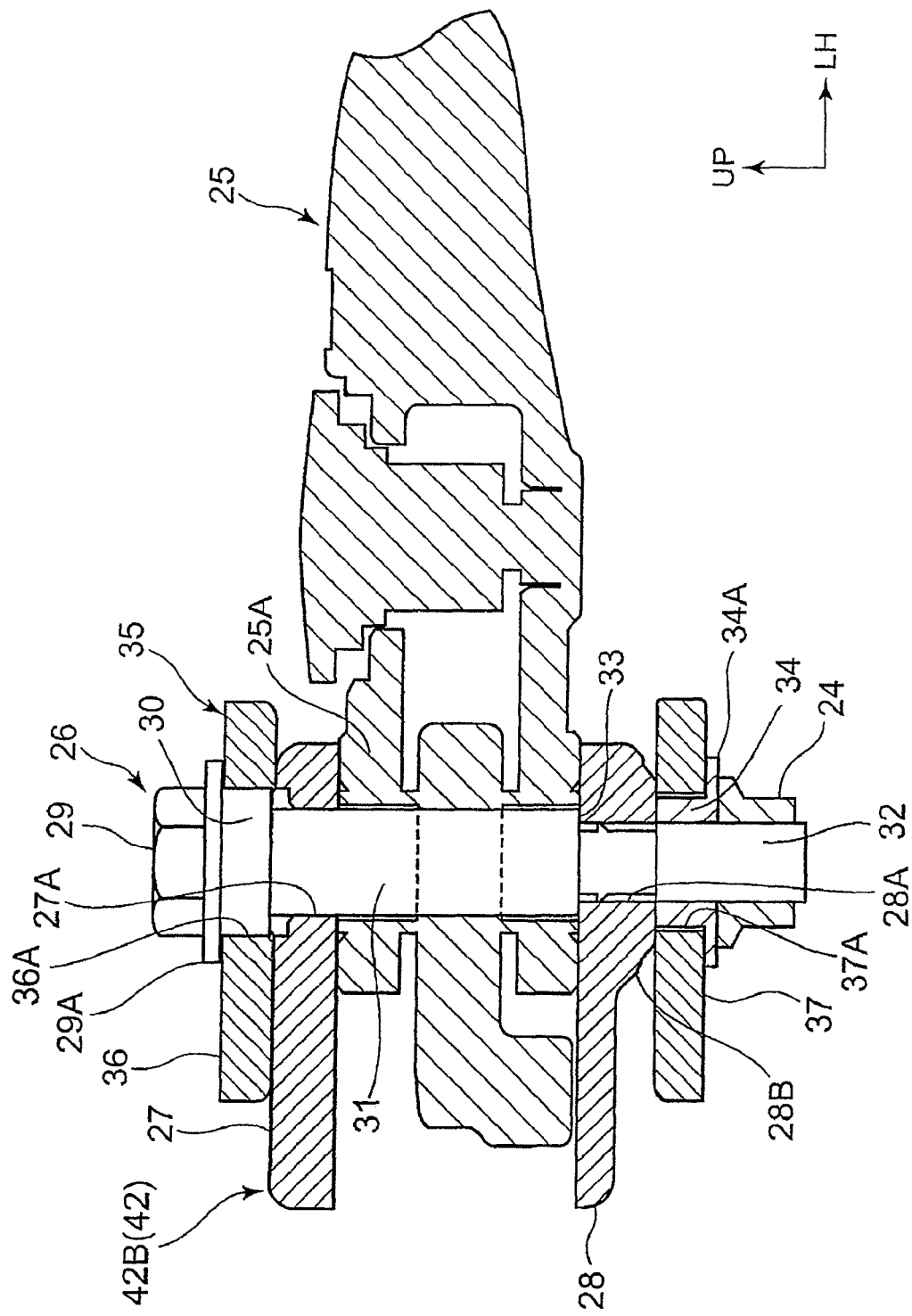
FIG. 5 is a cross-sectional view taken along a line V-V in FIG. 3.

FIG. 5 is a cross-sectional view taken along a line V-V in FIG. 3.

As shown in FIG. 5, the lever holder portion 42B of the master cylinder 42 includes an upper plate portion 27 and a lower plate portion 28 that sandwich a pivot hole portion 25A formed on a proximal end of the clutch lever 25 from above and below respectively. Hole portions 27A, 28A that allow the insertion of the pivot bolt 26 therein are formed in the upper plate portion 27 and the lower plate portion 28 respectively. A thick wall portion 28B that projects downwardly is formed on a lower surface of the lower plate portion 28 around the hole portion 28A.

The pivot bolt 26 includes a hexagonal head portion 29 on which a tool is fitted; a columnar upper support portion 30 that is contiguously formed with the head portion 29; a pivot shaft portion 31 that is inserted into the hole portion 27A formed in the upper plate portion 27 and the pivot hole portion 25A formed in the clutch lever 25; and a fastening shaft portion 32 that is inserted into the hole portion 28A formed in the lower plate portion 28 and is fixed by a nut 24. The pivot bolt 26 is a stepped bolt where a stepped portion 33 is formed on an intermediate portion of a shaft portion, and the fasting shaft portion 32 is formed with a diameter smaller than a diameter of the pivot shaft portion 31. A cylindrical collar 34 into which the fastening shaft portion 32 is inserted is interposed between the nut 24 and the lower plate portion 28. Further, a flange portion 29A that projects in the radial direction is formed on a lower portion of the head portion 29.

The pivot bolt 26 is fixed to the lever holder portion 42B in a state where the stepped portion 33 is brought into contact with an upper surface of the lower plate portion 28 and the nut 24 is fastened to the fastening shaft portion 32 on a lower surface side of the lower plate portion 28 by way of the collar 34 thus sandwiching the lower plate portion 28 in the vertical direction. On an upper portion of the pivot bolt 26, the pivot shaft portion 31 is merely positioned in the radial direction by being fitted in the hole portion 27A, a lower surface of the upper support portion 30 and an upper surface of the upper plate portion 27 are spaced apart from each other. Thus, a fastening force of the pivot bolt 26 in the axial direction does not act on the upper plate portion 27. Accordingly, there exists no possibility that a distance between the upper plate portion 27 and the lower plate potion 28 is decreased due to the fixing of the pivot bolt 26. Thus, a friction of the pivot hole portion 25A can be decreased whereby the operability of the clutch lever 25 is improved.

Figure 6:
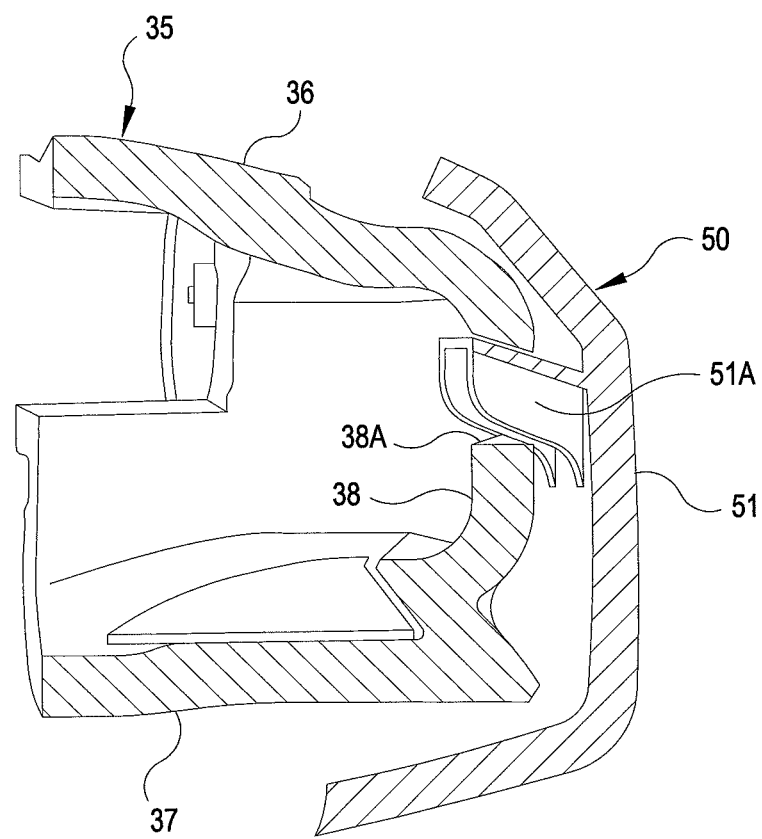
FIG. 6 is a cross-sectional view taken along a line VI-VI in FIG. 3.

FIG. 6 is a cross-sectional view taken along a line VI-VI in FIG. 3.

As shown in FIG. 5 and FIG. 6, the holder member 35 includes an upper cover portion 36 that is arranged on an upper surface side of the upper plate portion 27; a lower cover portion 37 that is arranged on a lower surface side of the lower plate portion 28; and a front cover portion 38 that connects the upper cover portion 36 and the lower cover portion 37 in front of the lever holder portion 42B.

The upper cover portion 36 includes an engaging hole 36A into which the upper support portion 30 of the pivot bolt 26 is inserted, and the lower cover portion 37 includes an engaging hole 37A into which the fastening shaft portion 32 is inserted.

The upper cover portion 36 is positioned in the radial direction of the pivot bolt 26 by inserting the upper support portion 30 into the engaging hole 36A, and is positioned in the axial direction by sandwiching a peripheral portion of the engaging hole 36A between the flange portion 29A and the upper surface of the upper plate portion 27. A distance between the flange portion 29A and the upper surface of the upper plate portion 27 is restricted by the contact between the stepped portion 33 and the lower plate portion 28 so as to prevent the upper cover portion 36 from being compressed.

The lower cover portion 37 is positioned in the radial direction of the pivot bolt 26 by inserting the fastening shaft portion 32 into the engaging hole 37A by way of the collar 34, and is positioned in the axial direction by sandwiching a peripheral portion of the engaging hole 37A between the thick wall portion 28B and the flange portion 34A of the cylindrical collar 34.

As shown in FIG. 6, an engaging hole 38A (engaging portion) that penetrates the front cover portion 38 is formed in the front cover portion 38. A projecting portion 51A that projects toward a front cover portion 38 side (a projecting portion that projects toward a holder member side) is formed on a rear surface of the inner fixing portion 51 of the knuckle guard 50. The inner fixing portion 51 is positioned with respect to the holder member 35 due to the engagement of the projecting portion 51A with the engaging hole 38A formed in the front cover portion 38.

Figure 7:
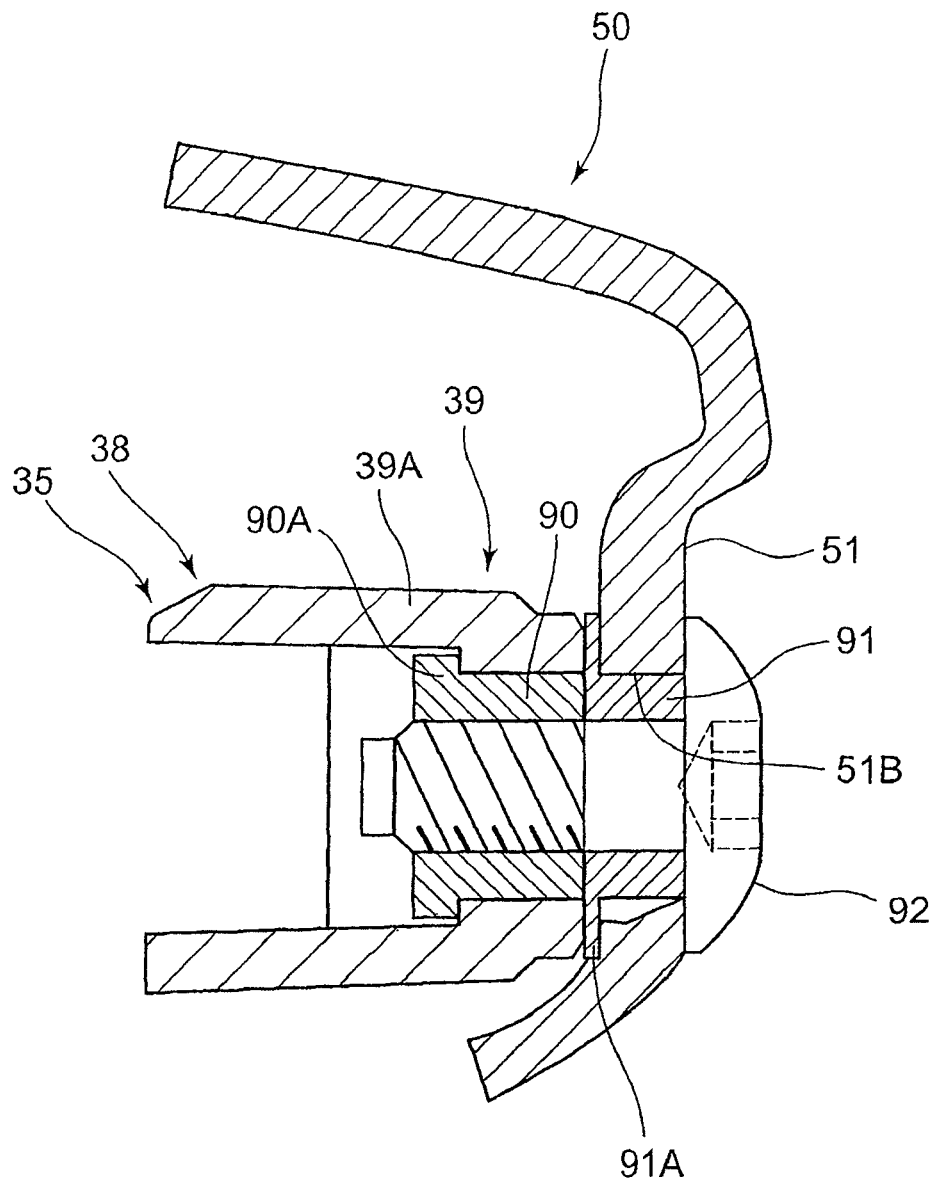
FIG. 7 is a cross-sectional view taken along a line VII-VII in FIG. 3.
Figure 7:
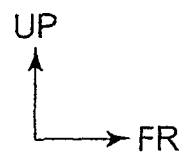

FIG. 7 is a cross-sectional view taken along a line VII-VII in FIG. 3.

As shown in FIG. 7, a fastening portion 39 is provided to the front cover portion 38 of the holder member 35 and is provided adjacent to the engaging hole 38A. The fastening portion 39 is formed by embedding a nut 90 in a cylindrical portion 39A. A position of the nut 90 in the axial direction is restricted by bringing a flange portion 90A into contact with a stepped portion of the cylindrical portion 39A.

A hole 51B in which a cylindrical collar 91 is fitted is formed in a front surface of the inner fixing portion 51 of the knuckle guard 50, and a bolt 92 that rigidly fixes the inner fixing portion 51 to the front cover portion 38 by fastening is inserted into the collar 91. The bolt 92 is inserted into the collar 91 from a front side of the inner fixing portion 51 and is fastened to the nut 90 so that a peripheral portion of the hole 51B formed in the inner fixing portion 51 is sandwiched between the flange portion 91A of the collar 91 and a head portion of the bolt 92 and the fastening portion 39 is brought into contact with a bottom surface of the flange portion 91A.

As described above, the holder member 35 is mounted on the handle pipe 16 by making use of the pivot bolt 26 of the clutch lever 25, and the knuckle guard 50 is fastened to the fastening portion 39 of the front cover portion 38 of the holder member 35 using the bolt 92. Accordingly, the number of parts for mounting the knuckle guard 50 can be decreased. Further, the projecting portion 51A formed on the rear surface of the knuckle guard 50 is engaged with the engaging hole 38A formed in the holder member 35. Thus, it is possible to prevent the rotation of the knuckle guard 50 against forces generated in the directions which tend to make the knuckle guard 50 rotate using the weight fixing bolt 56 and the bolt 92 as a fulcrum respectively.

Figure 8:
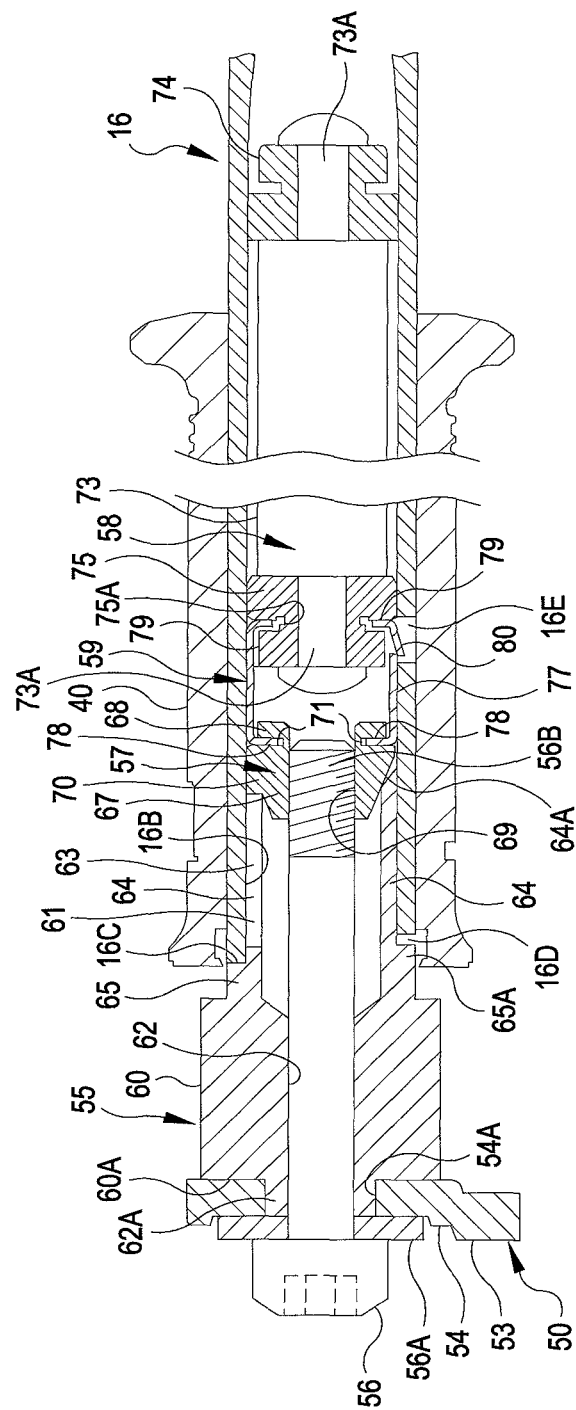
FIG. 8 is a cross-sectional view of a handle pipe showing the handle weight mounting structure.

FIG. 8 is a cross-sectional view of the handle pipe 16 showing the handle weight mounting structure.

As shown in FIG. 8, in the inside of a portion of the handle pipe 16 on which the grip 40 is mounted, a portion of the handle weight 55 and a portion of the weight fixing bolt 56, a nut member 57 that is threadedly engaged with the weight fixing bolt 56 and is engaged with the handle weight 55, a columnar dynamic damper 58, and a mounting member 59 that connects the nut member 57 and the dynamic damper 58 to each other are arranged.

Figure 9A:
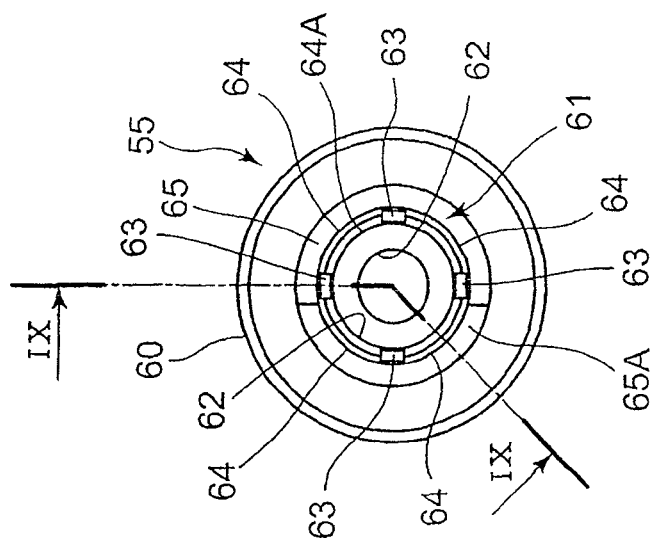
FIGS. 9(a) and 9(b) are views showing the handle weight.
Figure 9B:
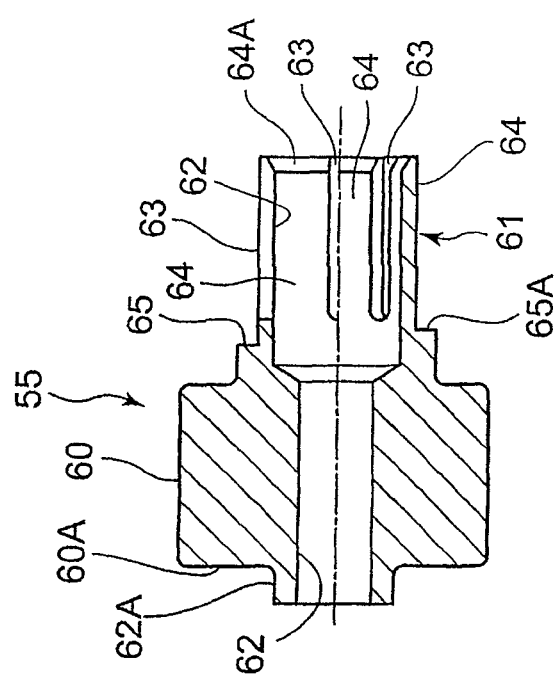

FIGS. 9(a) and 9(b) are views showing the handle weight 55, wherein FIG. 9(a) is a plan view, and FIG. 9(b) is a cross-sectional view taken along a line IX-IX in FIG. 9(a).

As shown in FIG. 8 and FIGS. 9(a) and 9(b), the handle weight 55 includes a circular cylindrical weight body 60, a circular cylindrical portion 61 that extends in the axial direction from the weight body 60 and is fitted in an inner peripheral portion 16B of the handle pipe 16; and a bolt insertion hole 62 that penetrates the weight body 60 and the circular cylindrical portion 61 in the axial direction.

The weight fixing bolt 56 is inserted into the bolt insertion hole 62 from the outside. An inner diameter of the bolt insertion hole 62 on a circular cylindrical portion 61 side is set larger than an inner diameter of the bolt insertion hole 62 on a weight body 60 side so as to allow the engagement of the nut member 57 with the bolt insertion hole 62.

A circular cylindrical end portion 62A positioned on an outer side of the bolt insertion hole 62 in the vehicle widthwise direction (an outer end portion in the vehicle widthwise direction) projects outwardly from an outer side surface 60A of the weight body 60. The knuckle guard 50 includes a fitting hole portion 54A that is formed on an outer mounting portion 54 (mounting portion outside in the vehicle widthwise direction) formed on a rear end of the outer fixing portion 53. The knuckle guard 50 is fixed by being sandwiched between a head portion of the weight fixing bolt 56 and the outer side surface 60A in a state where the fitting hole portion 54A is fitted on the circular cylindrical end portion 62A at a spigot. A height of the circular cylindrical end portion 62A is set substantially equal to a plate thickness of the fitting hole portion 54A. Further, a washer 56A is interposed between the head portion of the weight fixing bolt 56 and the fitting hole portion 54A.

As described above, the knuckle guard 50 is fitted on the handle weight 55 at a spigot, and is fastened together with the handle weight 55 using the weight fixing bolt 56. Thus, the number of parts for fastening the knuckle guard 50 can be decreased. Further, most of a fastening force of the weight fixing bolt 56 is received by the metal-made circular cylindrical end portion 62A. Thus, it is possible to prevent the peripheral portion of the resin-made fitting hole portion 54A from being excessively fastened.

The circular cylindrical portion 61 is formed with a smaller diameter and a smaller thickness than those of the weight body 60. The circular cylindrical portion 61 is divided into a plurality of partial circular cylindrical portions 64 by forming a plurality of split grooves 63 that extend in the axial direction in the circular cylindrical portion 61 so that the circular cylindrical portion 61 is opened in the radially outward direction when the nut member 57 is engaged with the bolt insertion hole 62. In this embodiment, the split grooves 63 are arranged at four positions respectively at intervals of approximately 90°. Thus, the circular cylindrical portion 64 is divided into four partial circular cylindrical portions 64. A tapered portion 64A that is tapered toward a distal end of the partial circular cylindrical portion 64 is formed on distal end portions of the partial circular cylindrical portions 64 on an inner side in the vehicle widthwise direction inside the bolt insertion hole 62.

A contact portion 65 that is brought into contact with an outer end 16C of the handle pipe 16 is formed on a proximal end portion of the circular cylindrical portion 61, and an engaging projection 65A that is engaged with a notched portion 16D formed on the outer end 16C is formed on a portion of the contact portion 65. The rotation of the handle weight 55 can be prevented due to the engagement of the engaging projection 65A with the notched portion 16D.

Figure 10:
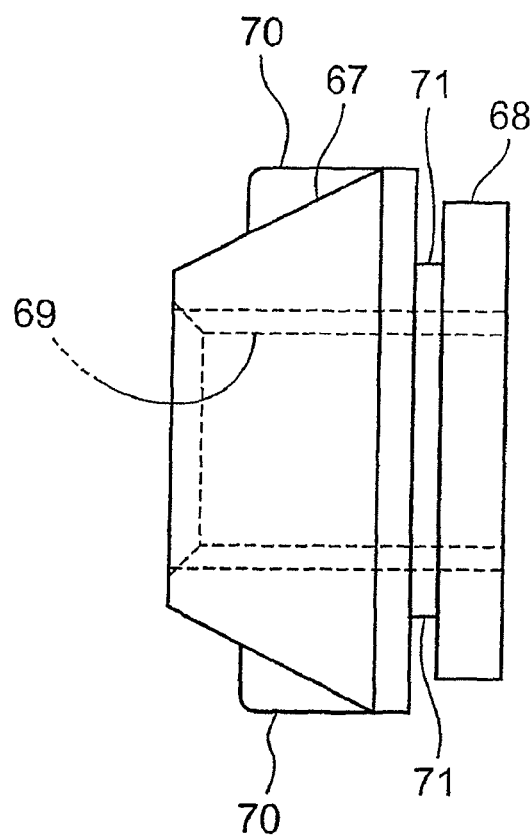
FIG. 10 is a plan view of a nut member.

FIG. 10 is a plan view of the nut member 57.

The nut member 57 that is formed into a circular cylindrical shape includes a tapered cylindrical portion 67 that is formed into a tapered shape where an outer peripheral portion is tapered toward one end side in the axial direction; a cylindrical portion 68 that is formed on the other end side with an outer diameter set smaller than an outer diameter of the tapered cylindrical portion 67; and a threaded hole portion 69 that penetrates the nut member 57 in the axial direction.

The threaded hole portion 69 formed in the nut member 57 is threadedly engaged with a distal end of the weight fixing bolt 56 that projects from a tapered portion 64A side of the handle weight 55. The nut member 57 is arranged in the direction that the nut member 57 enters the bolt insertion hole 62 with a distal end of the tapered cylindrical portion 67 directed ahead, is moved the inside of the bolt insertion hole 62 with fastening of the weight fixing bolt 56, and expands the partial circular cylindrical portions 64 thus generating a wedge action. More specifically, the handle weight 55 is fixed to the handle pipe 16 in such a manner that, due to the wedge action of the nut member 57, the partial circular cylindrical portions 64 are pushed to the inner peripheral portion 16B of the handle pipe 16 so that the partial circular cylindrical portions 64 cut into the inner peripheral portion 16B.

Further, an adhesive agent is applied to a threaded portion 56B formed on a distal end of the weight fixing bolt 56 where the weight fixing bolt 56 is threadedly engaged with the threaded hole portion 69, and the threaded portion 56B is firmly fastened to the threaded hole portion 69 coupled with an adhesive force of the adhesive agent.

The tapered cylindrical portion 67 of the nut member 57 has the taper substantially equal to the taper of the tapered portion 64A of the partial circular cylindrical portion 64 of the handle weight 55. Since the tapered cylindrical portion 67 is introduced along the tapered portion 64A, the nut member 57 is smoothly engaged with the bolt insertion hole 62 formed in the circular cylindrical portion 61.

A pair of projecting portions 70, 70 that project in the radially outward direction is formed on an outer peripheral portion of the tapered cylindrical portion 67. The projecting portions 70, 70 are arranged opposite to each other and are engaged with the pair of split grooves 63, 63, and the nut member 57 is moved in the axial direction while being guided by the grooves 63, 63. Due to such a construction, the rotation of the nut member 57 when the nut member 57 is moved in the inside of the bolt insertion hole 62 can be prevented. Thus, the handle weight 55 can be securely fixed.

A pair of nut-side groove portions 71, 71 (groove portions) indented toward an inner peripheral side is formed on an outer peripheral portion of the cylindrical portion 68 of the nut member 57, and one end of the mounting member 59 is connected to the nut-side groove portions 71, 71. The nut-side groove portions 71, 71 are groove portions that are formed on a center portion side of the nut member 57 in the vehicle widthwise direction, and a width across flats is formed on an outer peripheral portion of the nut member 57.

As shown in FIG. 8, the dynamic damper 58 is constituted of a columnar inner weight 73 that extends in the axial direction inside the handle pipe 16, and a cylindrical inner-end-side rubber member 74 and a cylindrical outer-end-side rubber member 75 that are arranged on both end portions of the inner weight 73 respectively. The inner-end-side rubber member 74 and the outer-end-side rubber member 75 are formed of an elastic member made of rubber respectively.

On both end portions of the inner weight 73, support shaft portions 73A, 73A that support the inner-end-side rubber member 74 and the outer-end-side rubber member 75 are formed respectively. The inner-end-side rubber member 74 and the outer-end-side rubber member 75 are fitted on outer peripheral portions of the support shaft portions 73A, 73A respectively. The inner-end-side rubber member 74 and the outer-end-side rubber member 75 are formed with a diameter larger than a diameter of the inner weight 73 so that the inner weight 73 is supported on the inner-end-side rubber member 74 and the outer-end-side rubber member 75 in a floating manner so as to prevent the inner weight 73 from coming into contact with the inner peripheral portion 16B of the handle pipe 16. Due to the provision of the dynamic damper 58, a resonance frequency of the handle pipe 16 can be shifted to a frequency which is hardly influenced by vibrations thus realizing the vibration isolation.

A weight-side groove portion 75A that is indented toward an inner peripheral side is formed on an outer peripheral portion of the outer-end-side rubber member 75 that is arranged adjacent to the nut member 57, and the other end of the mounting member 59 is connected to the weight-side groove portion 75A.

Figure 11A:
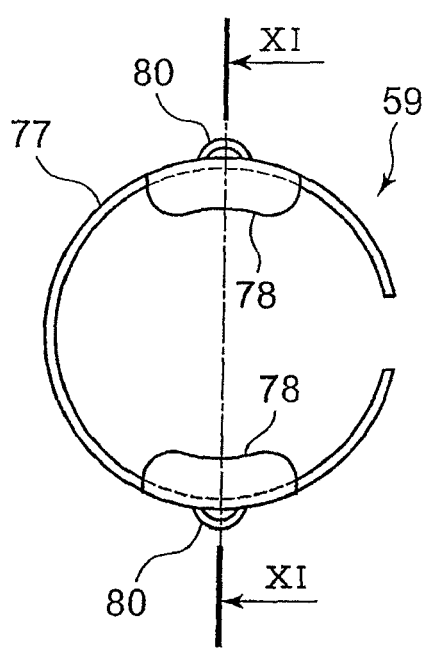
FIGS. 11(a) and 11(b) are views showing a mounting member.
Figure 11B:
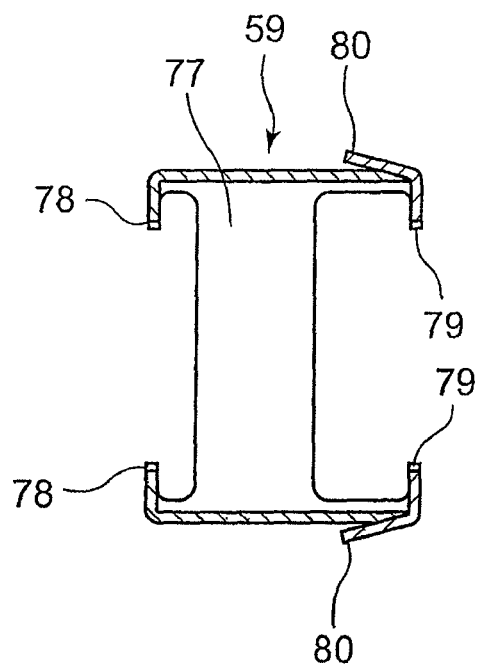

FIGS. 11(a) and 11(b) are views showing the mounting member 59, wherein FIG. 11(a) is a plan view, and FIG. 11(b) is a cross-sectional view taken along a line XI-XI in FIG. 11(a).

As shown in FIG. 8 and FIGS. 11(a) and 11(b), the mounting member 59 is a ring-shaped member that is formed into a C shape as viewed in a plan view. The mounting member 59 includes a ring body portion 77 having a C-shaped ring shape, a pair of pawl portions 78, 78 (engaging portions) project in the radially inward direction from one end of the ring body portion 77 in the axial direction; a pair of pawl portions 79, 79 that project in the radially inward direction from the other end of the ring body portion 77 in the axial direction; and a pair of tongue portions 80, 80 that project in the radially outward direction from an outer peripheral portion of the ring body portion 77 on a pawl portions 79, 79 side.

The mounting member 59 is fixed to the inside of the handle pipe 16 in such a manner that the ring body portion 77 is fitted in the inner peripheral portion 16B of the handle pipe 16 and the tongue portions 80, 80 are engaged with a pair of positioning holes 16E, 16E formed in the inner peripheral portion 16B.

The pawl portions 78, 78 formed on one end side of the mounting member 59 are engaged with the nut member 57 by fitting engagement with the nut-side groove portions 71, 71. The pawl portions 79, 79 formed on the other end side of the mounting member 59 are engaged with the weight-side groove portion 75A of the outer-end-side rubber member 75 by fitting engagement. More specifically, the nut member 57 and the inner weight 73 are connected to each other using the mounting member 59 arranged therebetween.

As described above, the mounting member 59 is connected to the nut member 57 that fixes the handle weight 55 and the dynamic damper 58 is supported on the mounting member 59. Accordingly, the dynamic damper 58 can be mounted in the inside of the handle pipe 16 with the simple construction, and the dynamic damper 58 can be mounted in the inside of the handle pipe 16 while firmly fixing the handle weight 55 to the handle pipe 16 by rigid mounting. Further, the pawl portions 79, 79 are connected to the outer-end-side rubber member 75. Thus, it is possible to prevent the occurrence of a situation where an operation of the dynamic damper 58 is impeded by the mounting member 59 whereby the favorable vibration isolation property can be acquired.

Further, the dynamic damper 58 is provided independently from the handle weight 55. Thus, the dynamic damper 58 can be effectively operated whereby the favorable vibration isolation property can be acquired. Still further, the vibration isolation property can be adjusted independently between the handle weight 55 and the dynamic damper 58. Thus, the vibration isolation property can be easily set and changed.

Here, the steps of mounting the handle weight 55 and the dynamic damper 58 are explained in conjunction with FIG. 8.

Firstly, a sub-assembled body is formed by integrally connecting the nut member 57 and the dynamic damper 58 using the mounting member 59. Next, the above-mentioned sub-assembled body is inserted into the handle pipe 16 with an outer end 16C side ahead, and the tongue portions 80, 80 of the mounting member 59 and the positioning holes 16E, 16E are engaged with each other. The alignment of the tongue portions 80, 80 and the positioning holes 16E, 16E in the circumferential direction is performed using a jig. Further, the position of the nut member 57 in the rotational direction is fixed due to the engagement of the pawl portions 78, 78 with the nut-side groove portions 71, 71 having a width-across-flats shape.

Next, the handle weight 55 is inserted into the handle pipe 16. The pair of split grooves 63 of the circular cylindrical portion 61 is engaged with the projecting portions 70, 70 of the nut member 57.

Thereafter, the fitting hole portion 54A formed on the knuckle guard 50 is fitted on the circular cylindrical end portion 62A of the handle weight 55, the weight fixing bolt 56 is inserted into the bolt insertion hole 62 as well as the washer 56A. The weight fixing bolt 56 is threadedly engaged with the nut member 57. With such an operation, the handle weight 55 is fixed to the handle pipe 16 due to a wedge action of the nut member 57. The handle weight 55 is positioned in the axial direction of the handle pipe 16 due to the contact of the contact portion 65 with the outer end 16C. As a result, the position of the nut member 57 in the axial direction is also fixed. Further, since the position of the nut member 57 is fixed, the position of the dynamic damper 58 in the axial direction is fixed by way of the mounting member 59.

In threadedly engaging the weight fixing bolt 56 with the nut member 57, the rotation of the handle weight 55 is prevented due to the engagement of the engaging projection 65A and the notched portion 16D, and the rotation of the nut member 57 is prevented due to the engagement of the projecting portions 70, 70 and the split grooves 63, 63. Thus, the weight fixing bolt 56 can be easily fastened to the nut member 57 so that the handle weight 55 can be surely fixed.

Figure 12:
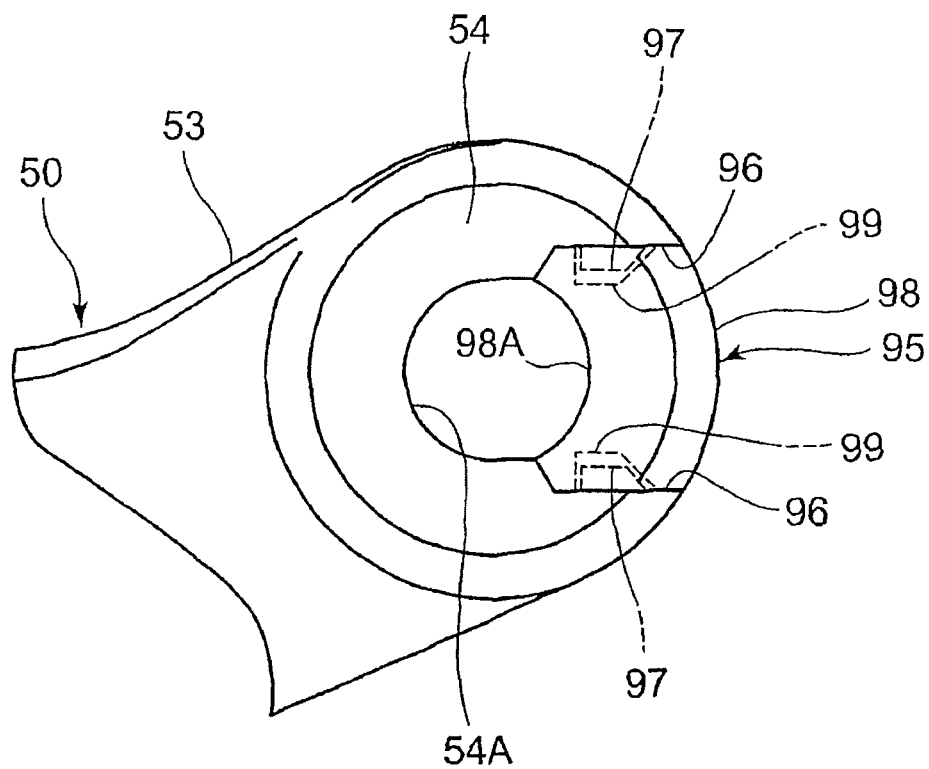
FIG. 12 is a side view showing an area in the vicinity of a fitting hole portion formed in an outer mounting portion of a knuckle guard.

FIG. 12 is a side view showing an area around the fitting hole portion 54A formed on the outer mounting portion 54 of the knuckle guard 50.

A U-shaped portion 95 that opens rearwardly is formed on the outer mounting portion 54 of the knuckle guard 50. On a pair of open edges 96, 96 of the U-shaped portion 95 that face each other in an opposed manner, projecting portions 97, 97 that project toward an open portion side are formed respectively.

A rear member 98 that is formed in a state where the rear member 98 occupies the opening portion of the U-shaped portion 95 is mounted in the U-shaped portion 95. The rear member 98 is provided as a part separate from the knuckle guard 50. Engaging holes 99, 99 in which the projections 97, 97 of the U-shaped portion 95 are fitted are formed in the rear member 98, and the rear member 98 is engaged with the U-shaped portion 95 due to the fitting engagement of the engaging holes 99 and the projecting portions 97, 97. The rear member 98 includes an arcuate portion 98A, and the arcuate portion 98A forms a rear portion of a peripheral portion of the fitting hole portion 54A.

The rear member 98 is configured to be removed rearwardly from the U-shaped portion 95 when a load which exceeds a predetermined value acts on the rear member 98 by adjusting the setting of engagement of the engaging holes 99 and the projecting portions 97, 97. More specifically, when a load that pushes the knuckle guard 50 frontwardly acts to exceed a predetermined value, the rear member 98 is pushed by a rear portion of the circular cylindrical end portion 62A (FIG. 8) of the handle weight 55 and is removed rearwardly. Thus, the knuckle guard 50 can be removed frontwardly such that the circular cylindrical end portion 62A is allowed to pass through the U-shaped portion 95 thus releasing the load acting on the knuckle guard 50.

As has been explained heretofore, according to the embodiment to which the present invention is applied, the handle weight mounting structure includes the hollow handle pipe 16; the handle weight 55 that is arranged in the handle pipe 16 by insertion from the outer end 16C of the handle pipe 16, wherein the handle weight 55 is provided with the bolt insertion hole 62 that has the tapered portion 64A on the inner portion thereof in the vehicle widthwise direction and the split groove 63; the nut member 57 that is formed into a tapered shape and is engaged with the split-groove 63 side of the handle weight 55; and the weight fixing bolt 56 that is made to pass through the bolt insertion hole 62 formed in the handle weight 55 and fastens the handle weight 55 and the nut member 57, wherein the mounting member 59 for the dynamic damper 58 that is supported in the inside of the handle pipe 16 in a floating state is mounted on the nut member 57. Thus, the dynamic damper 58 can be supported in the inside of the handle pipe 16 by the mounting member 59. Accordingly, the dynamic damper 58 can be mounted in the inside of the handle pipe 16 while rigidly mounting the handle weight 55 on the handle pipe 16.

Further, the nut-side groove portions 71, 71 are formed on the center portion side of the nut member 57 in the vehicle widthwise direction, and the pawl portions 78, 78 that are engaged with the nut-side groove portions 71, 71 are formed on the mounting member 59. Thus, the dynamic damper 58 can be sub-assembled to the nut member 57 with the simple constitution where the pawl portions 78, 78 of the mounting member 59 are engaged with the nut-side groove portions 71, 71 of the nut member 57.

Further, by engaging the nut member 57 with the split grooves 63, the rotation of the nut member 57 can be prevented. Thus, the handle weight 55 and the dynamic damper 58 can be securely fixed to each other.

Further, the adhesive agent is applied to the threadedly engaging portion 56B of the weight fixing bolt 56 and the nut member 57. Thus, the threaded engagement of the weight fixing bolt 56 and the nut member 57 can be fixed by the adhesive agent whereby the fixing of the handle weight 55 to the handle pipe 16 can be made more stable.

Still further, the knuckle guard 50 is rigidly supported on the holder member 35 on the center side of the handle pipe 16 in the vehicle widthwise direction and the handle weight 55 by the bolt 92. Thus, the knuckle guard 50 becomes a so-called closed type whereby the knuckle guard 50 can be firmly fixed, and the vibration isolation property can be also enhanced by the handle weight 55 and the dynamic damper 58.

Further, the circular cylindrical end portion 62A on the vehicle widthwise outer side of the bolt insertion hole 62 formed in the handle weight 55 projects outward from the outer side surface 60A of the handle weight 55, and the knuckle guard 50 is fastened to the circular cylindrical end portion 62A of the bolt insertion hole 62 by the weight fixing bolt 56 at a spigot. Thus, the number of parts for fastening the knuckle guard 50 can be decreased, and also the knuckle guard 50 is fastened to the circular cylindrical end portion 62A on a vehicle widthwise outer side of the handle weight 55 whereby the knuckle guard 50 can be supported in a stable manner.

Further, the outer mounting portion 54 of the knuckle guard 50 on the vehicle widthwise outer side is formed into an approximately U-shape opening rearward, the projecting portions 97, 97 which project toward the opening portion side are formed on both open edges 96, 96 of the U-shaped portion 95 which face each other in an opposed manner, the rear member 98 that occupies the opening portion of the U-shaped portion 95 of the knuckle guard 50 and is engaged with the projecting portions 97, 97 is provided as a part separate from the knuckle guard 50. Due to such a construction, when a large load is applied to the knuckle guard 50 to the front, the rear member 98 is removed from the U-shaped portion 95, and the knuckle guard 50 can be removed to the front by allowing the circular cylindrical end portion 62A of the handle weight 55 to pass through the U-shaped portion 95 which opens rearwardly. Accordingly, it is possible to prevent a large load from being applied to the knuckle guard 55, the handle pipe 16, the handle weight 55 and the like, and a replacement cost of parts can be suppressed.

Further, the holder member 35 is mounted on the handle pipe 16 by the pivot bolt 26 of the clutch lever 25 and the knuckle guard 50 is fastened to the fastening portion 39 formed on the front surface of the front cover portion 38 of the holder member 35 by the bolt 92. Thus, the number of parts for mounting the knuckle guard 50 can be decreased, and the rotation of the knuckle guard 50 can be prevented due to the engagement of the projecting portion 51A formed on the rear surface of the inner fixing portion 51 of the knuckle guard 50 with the engaging hole 38A formed in the holder member 35.

The above-mentioned embodiment shows one mode of the handle weight mounting structure to which the present invention is applied. The present invention is not limited to the above-mentioned embodiment.

In the above-mentioned embodiment, the explanation is made with respect to a case where the holder member 35 is mounted on the handle pipe 16 by the pivot bolt 26 of the clutch lever 25, and the knuckle guard 50 is fastened to the fastening portion 39 of the front cover portion 38 of the holder member 35 by the bolt 92. However, the present invention is not limited to such a construction. For example, a holder member may be mounted on a handle pipe by a pivot bolt that pivotally supports a brake lever used as a lever member on a master cylinder portion of a brake. In addition, a knuckle guard may be fastened to a fastening portion formed on a front surface of the holder member.

Further, in the above-mentioned embodiment, although the explanation is made by taking the motorcycle 1 as the saddle-ride-type vehicle to which the present invention is applied, the present invention is also applicable to a saddle-ride-type vehicle such as a three-wheeled vehicle or a four-wheeled buggy.

Figure 13:
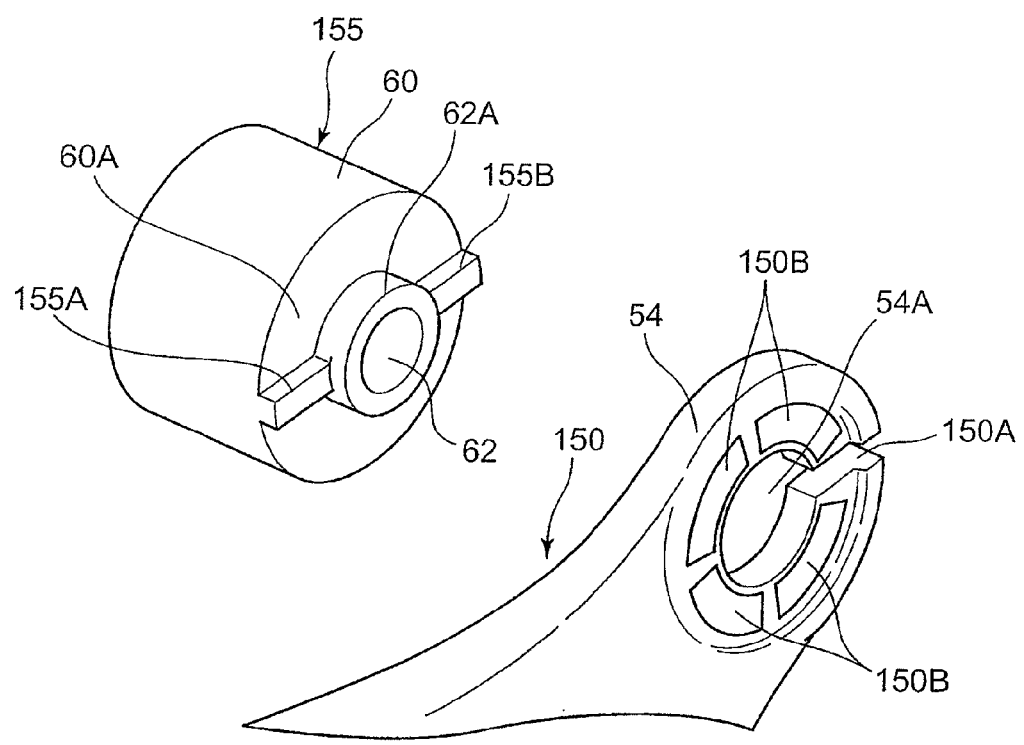
FIG. 13 is a view showing a mounting portion of a knuckle guard according to a modification 1.

FIG. 13 is a view showing a mounting portion of a knuckle guard according to a modification 1 of the embodiment. In this modification 1, parts having the substantially same construction as the corresponding parts in the above-mentioned embodiment are given the same symbols and their repeated explanation is omitted.

As shown in FIG. 13, a handle weight 155 includes a weight body 60 and a circular cylindrical end portion 62A, and ribs 155A, 155B which project in the radial direction from an outer peripheral surface of the circular cylindrical end portion 62A and extend in the longitudinal direction are formed on an outer side surface 60A of the weight body 60. An extension line of the ribs 155A, 155B passes the center of the circular cylindrical end portion 62A.

A knuckle guard 150 includes an outer mounting portion 54 and a fitting hole portion 54A, and a slit 150A that extends rearwardly from the fitting hole portion 54A is formed in a rear portion of the outer mounting portion 54. A rear portion of the fitting hole portion 54A opens rearwardly by the slit 150A.

The knuckle guard 150 is mounted on the handle weight 155 in such a manner that the fitting hole portion 54A is fitted on the circular cylindrical end portion 62A and the knuckle guard 150 is fastened to the handle weight 155 by the weight fixing bolt 56 (FIG. 8) which is inserted into the knuckle guard 150 as well as the washer 56A (FIG. 8) from the outside. In a state where the knuckle guard 150 is mounted on the handle weight 155, the rear rib 155B is engaged with the slit 150A. Further, a groove (not shown in the drawing) with which the front rib 155A is engaged is formed on an inner surface of the outer mounting portion 54. As described above, by engaging the ribs 155A, 155B with the outer mounting portion 54, the positioning of the knuckle guard 150 can be performed and the rotation of the knuckle guard 150 can be prevented.

A plurality of projecting seat portions 150B that project outwardly from a peripheral portion of the fitting hole portion 54A are formed at positions in the vicinity of the fitting hole portion 54A. The washer 56A is received by the projecting seat portions 150B.

When a load of a predetermined value or more that pushes the knuckle guard 150 towards the front acts on the knuckle guard 150, the knuckle guard 150 can be removed to the front such that the circular cylindrical end portion 62A is allowed to pass through the slit 150A thus releasing the load acting on the knuckle guard 150.

Figure 14:
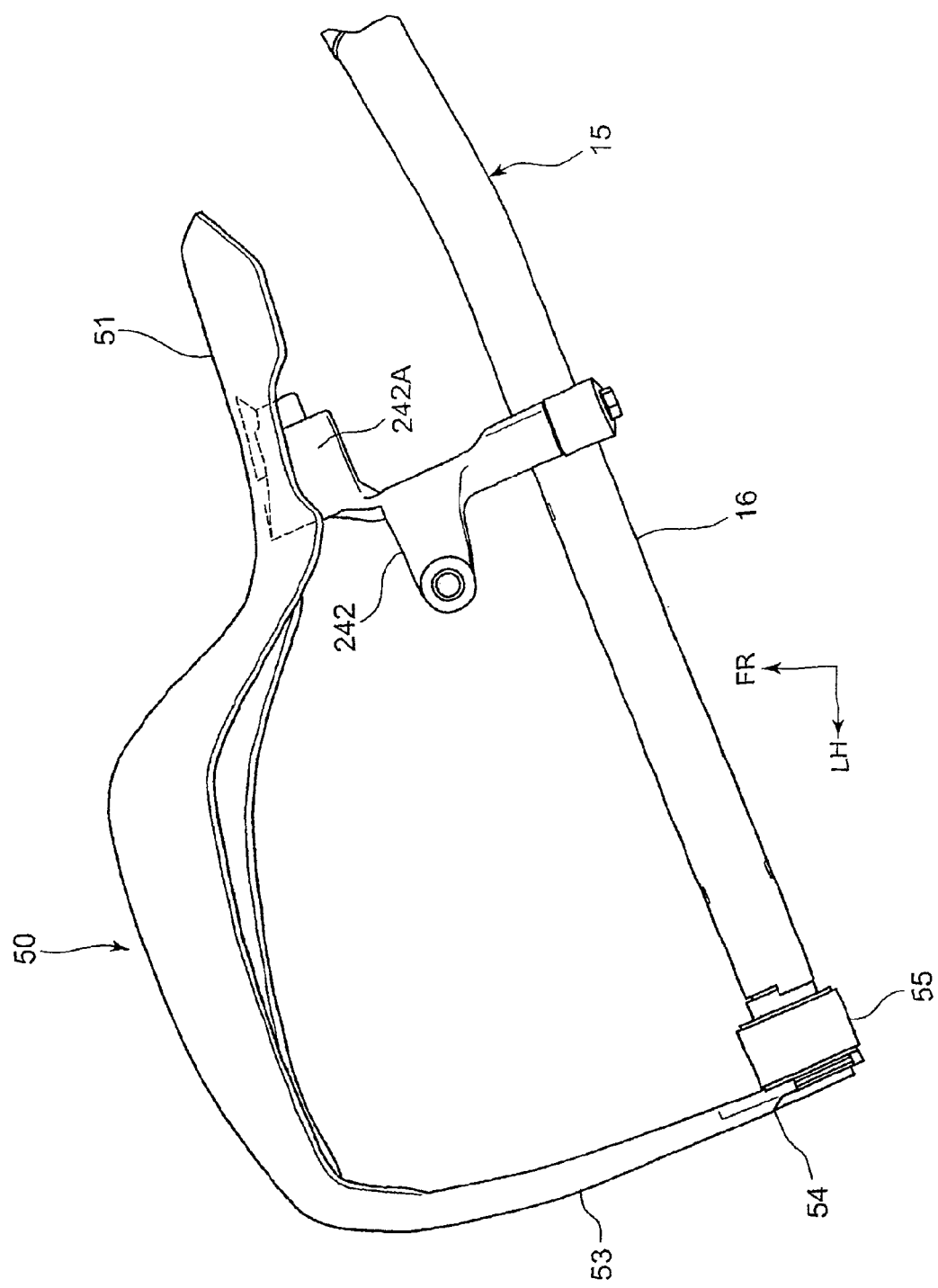
FIG. 14 is a view showing a mounting portion of a knuckle guard according to a modification 2.

FIG. 14 is a view showing a mounting portion of a knuckle guard 50 according to a modification 2 of the embodiment. In this modification 2, parts having the substantially same constitution as the corresponding parts of the above-mentioned embodiment are given the same symbols and their repeated explanation is omitted.

In the modification 2, the explanation is made with respect to a case where a motorcycle 1 includes an automatic transmission and the like, and does not include a hydraulic clutch type master cylinder 42 and a clutch lever 25.

A mirror stay 242 made of an aluminum alloy which extends to the front is fixed to a handle pipe 16, and a side mirror 23 (FIG. 1) is mounted on the mirror stay 242. The mirror stay 242 has a holder portion 242A that extends to the front, and a knuckle guard 50 is rigidly fastened to a front surface of the holder portion 242A by a bolt (not shown in the drawing) which is inserted into an inner fixing portion 51.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handle weight mounting structure of a saddle-ride-type vehicle comprising:
   a hollow handle pipe;
   a handle weight arranged in the handle pipe by insertion from an outer end of the handle pipe, the handle weight being provided integrally with
      a bolt insertion hole extending in an axial direction through an entire length of the handle weight, and having an inner diameter on an inner portion thereof in a vehicle widthwise direction that is set larger than an inner diameter on an outer portion thereof in the vehicle width direction,
      a tapered portion on an inner-most end of the bolt insertion hole, and
      a cut-through slot extending in an axial direction along the inner portion thereof, the cut-through slot exposing the bolt insertion hole from outside of the handle weight,
   a nut member formed with a tapered portion as an integral part thereof, the tapered portion of the nut being engaged with the tapered portion and the cut-through slot of the handle weight; and
   a bolt passing through the bolt insertion hole of the handle weight for fastening the handle weight and the nut member to each other;
   wherein a mounting member for a dynamic damper is supported on an inside of the handle pipe and is mounted on the nut member.

2. The handle weight mounting structure of a saddle-ride-type vehicle according to claim 1, wherein a circumferential groove portion is cut into an outer circumferential surface of a center portion of the nut member in the vehicle widthwise direction, and the mounting member is formed with an engaging portion extending radially inward for engagement with the circumferential groove portion of the nut member.

3. The handle weight mounting structure of a saddle-ride-type vehicle according to claim 1, wherein the nut member includes a projecting portion engaged with the cut-through slot of the handle weight.

4. The handle weight mounting structure of a saddle-ride-type vehicle according to claim 1, wherein the tapered portion of the nut member extends further along a length of the handle pipe than does the tapered portion of the handle weight.

5. The handle weight mounting structure of a saddle-ride-type vehicle according to claim 1, wherein an adhesive agent is applied to a threadedly engaging portion of the bolt threadedly engaged with the nut member.

6. The handle weight mounting structure of a saddle-ride-type vehicle according to claim 1, wherein a knuckle guard is arranged in front of the handle pipe, and the knuckle guard is rigidly supported on a center side of the handle pipe in the vehicle widthwise direction and the handle weight.

7. The handle weight mounting structure of a saddle-ride-type vehicle according to claim 6, wherein an outer end portion of the bolt insertion hole of the handle weight in the vehicle widthwise direction projects outwardly to a greater extent as compared to an outer side surface of the handle weight, and the knuckle guard is made of a resin and is fastened to the outer end portion of the bolt insertion hole in the vehicle widthwise direction by the bolt when the bolt is fixedly held in the bolt insertion hole.

8. The handle weight mounting structure of a saddle-ride-type vehicle according to claim 7, wherein the knuckle guard includes:
    a mounting portion on an outer side in the vehicle widthwise direction is formed in an approximately U-shape opening rearwardly,
    projecting portions projecting toward an opening portion side are formed on both open edges of a U-shaped portion which face each other in an opposed manner, and
    a rear member occupying an opening portion of the U-shaped portion of the knuckle guard is engaged with the projecting portions of the knuckle guard, and is provided as a part separate from the knuckle guard.

9. The handle weight mounting structure of a saddle-ride-type vehicle according to claim 6, wherein a lever member, a pivot bolt constituting a pivot of the lever member, and a holder member fastened to the pivot bolt are mounted on the handle pipe, and
    the knuckle guard is fastened to a fastening portion formed on a front surface of the holder member, and the knuckle guard includes:
        a projecting portion projects toward a holder member side is formed on a rear surface of the knuckle guard, and
        an engaging portion engaged with the projecting portion is formed on the holder member.

10. The handle weight mounting structure of a saddle-ride-type vehicle according to claim 1, wherein the mounting member is fixed to the inside of the handle pipe wherein a ring body portion is fitted in an inner peripheral portion of the handle pipe, and
    at least one tongue portion is engaged with at least one positioning hole formed in the inner peripheral portion of the handle pipe.

11. The handle weight mounting structure according to claim 10, wherein the mounting member is fixed to the inside of the handle pipe wherein a ring body portion is fitted in an inner peripheral portion of the handle pipe, and
    at least one tongue portion is engaged with at least one positioning hole formed in the inner peripheral portion of the handle pipe.

12. A handle weight mounting structure comprising:
    a hollow handle pipe;
    a handle weight arranged in the handle pipe, the handle weight being provided integrally with:
        a bolt insertion hole extending in an axial direction through an entire length of the handle weight, and having an inner diameter on an inner portion thereof in a vehicle widthwise direction that is set larger than an inner diameter on an outer portion thereof in the vehicle width direction,
        a tapered portion on an inner-most end of the bolt insertion hole, and
        a cut-through slot extending in an axial direction along the inner portion thereof, the cut-through slot exposing the bolt insertion hole from outside of the handle weight;
    a nut member formed with a tapered portion as an integral part thereof, the tapered portion of the nut being engaged with the tapered portion and the cut-through slot of the handle weight;
    a bolt passing through the bolt insertion hole of the handle weight for fastening the handle weight and the nut member to each other; and
    a mounting member operatively connected to the nut member forming a dynamic damper, said mounting member being supported on an inside of the handle pipe in a floating state,
    further comprising:
    a rubber member arranged in the hollow handle pipe in a position spaced apart from the nut member in a direction toward a center of the handle pipe,
    wherein the mounting member includes a pawl portion that projects in a radially inward direction and engages with a groove portion of the rubber member.

13. The handle weight mounting structure according to claim 12, wherein a circumferential groove portion is cut into an outer circumferential surface of a center portion of the nut member, and the mounting member is formed with an engaging portion extending radially inwardly for engagement with the circumferential groove portion of the nut member.

14. The handle weight mounting structure according to claim 13, wherein the tapered portion of the nut member extends further along a length of the handle pipe than does the tapered portion of the handle weight.

15. The handle weight mounting structure according to claim 12, wherein the nut member includes a projecting portion engaged with the cut-through slot of the handle weight.

16. The handle weight mounting structure according to claim 12, wherein an adhesive agent is applied to a threadedly engaging portion of the bolt threadedly engaged with the nut member.

17. The handle weight mounting structure according to claim 12, wherein a knuckle guard is arranged in front of the handle pipe, and the knuckle guard is rigidly supported on a center side of the handle pipe in the vehicle widthwise direction and the handle weight.

18. The handle weight mounting structure according to claim 17, wherein an outer end portion of the bolt insertion hole of the handle weight in the vehicle widthwise direction projects outwardly to a greater extent as compared to an outer side surface of the handle weight, and the knuckle guard is made of a resin and is fastened to the outer end portion of the bolt insertion hole in the vehicle widthwise direction by the bolt when the bolt is fixedly held in the bolt insertion hole.

19. The handle weight mounting structure according to claim 18, wherein the knuckle guard includes:
    a mounting portion on an outer side in the vehicle widthwise direction is formed in an approximately U-shape opening rearwardly,
    projecting portions projecting toward an opening portion side are formed on both open edges of a U-shaped portion which face each other in an opposed manner, and
    a rear member occupying an opening portion of the U-shaped portion of the knuckle guard is engaged with the projecting portions of the knuckle guard, and is provided as a part separate from the knuckle guard.

20. The handle weight mounting structure according to claim 17, wherein a lever member, a pivot bolt constituting a pivot of the lever member, and a holder member fastened to the pivot bolt are mounted on the handle pipe, and
- the knuckle guard is fastened to a fastening portion formed on a front surface of the holder member, and the knuckle guard includes:
- a projecting portion projects toward a holder member side is formed on a rear surface of the knuckle guard, and
- an engaging portion engaged with the projecting portion is formed on the holder member.

\* \* \* \* \*